United States Patent Office 2,877,227
Patented Mar. 10, 1959

2,877,227

PREPARATION OF DL-EMETINE AND STEREO-ISOMERS, AND INTERMEDIATES THEREFOR

Aaron Cohen and John Mervyn Osbond, Welwyn Garden City, Herts, England, assignors to Hoffmann-La Roche Inc., Nutley, N. J., a corporation of New Jersey No Drawing. Application December 7, 1956
Serial No. 626,831

Claims priority, application Great Britain
December 13, 1955

5 Claims. (Cl. 260—288)

The present invention relates to dl-emetine, to a process for the manufacture thereof and to intermediates formed in that process. More particularly it is concerned with dl-emetine, with salts thereof, with the individual optically active compounds comprised thereby and with a process for manufacture thereof.

Emetine has the structure shown in Figure XI in the attached flow-sheet, that is to say it is a 3-ethyl-9,10-dimethoxy- 2 - [[6',7'- dimethoxy - 1,2,3,4- tetrahydro-isoquinolyl- (1)]- methyl]- 1,2,3,4,6,7- hexahydro-benzo[a]-quinolizine. This structure contains four asymmetric carbon atoms and, having no planes of symmetry, represents eight racemates or sixteen optically active stereoisomers—one of these racemates being dl-emetine. Some of these racemates and many of these optically active stereoisomers have not hitherto been isolated or prepared.

It has been found, according to the present invention, that dl-emetine and salts thereof can be prepared by reacting a 2-(3',4'-dimethoxy-phenyl)-ethyl-halide with 4-methyl-5-ethyl-pyridone-(2) in the presence of an alkaline agent, treating the product with an alkyloxalate in the presence of an alkalimetal alkoxide, treating the pyruvic acid derivative obtained, after saponification of the ester group of desired, first with an alkali and then with hydrogen peroxide, reducing the pyridoneacetic acid formed, condensing the piperiodoneacetic acid obtained with 2-(3',4'-dimethoxy-phenyl)-ethyl-amine, cyclising the condensation product obtained and reducing the 1-[(1'- (3'',4''- dimethoxy- phenylethyl) - 2'- keto- 5'- ethyl-piperidyl-(4'))- methyl]-6,7- dimethoxy- 3,4- dihydro-isoquinoline to the corresponding 1,2,3,4-tetra-hydro-isoquinoline compound, cyclising the reduction product and reducing the salt of 2-[(6',7'-dimethoxy-1',2',3',4'-tetrahydro- isoquinolyl- (1'))- methyl]- 3- ethyl- 9,10- dimethoxy-1,2,3,4,6,7-hexahydro-benzo[a]quinolizinium to the corresponding 1,2,3,4,6,7-hexahydro-11b-benzo[a]quinolizine.

The new process will be illustrated by the accompanying flow-sheets. The nomenclature of the compounds is that shown in system number 1957 Patterson and Capell, "The Ring Index," New York, 1940.

The starting compounds used in that process may be prepared as follows:

(a) *4-methyl-5- ethyl- pyridone- (2)*.—2,6- dichloro-4-methyl-5-ethyl-pyridine is treated with an alkali-metal derivative of an alcohol of the following general formula

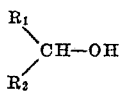

wherein $R_1$ and $R_2$ may each be a hydrogen atom or an alkyl group or the phenyl group, replacing the 6-chloro group by a hydrogen atom by hydrogenation, removing the alkyl or alkyl group in 2-position by hydrolysis or hydrogenolysis as the case may be, said hydrogenation and removal by hydrolysis being carried out in either sequence.

(b) *2-(3',4'dimethoxy-phenyl)-ethyl-iodide*.—By treating 2-(3',4'-dimethoxy-phenyl)-ethyl-chloride with sodium iodide in methyl ethyl ketone solution.

The first step of the process comprises condensing a 3,4-dimethoxy-phenyl-ethyl-halide (I), preferably the iodide, with 4-methyl-5-ethyl-pyridone-(2) (II). The reaction may conveniently be carried out in a solvent like benzene or an alcohol, for instance tertiary butanol, in the presence of an alkaline agent. Suitable alkaline agents for inclusion in the reaction mixture are alkali-metal alkoxides, for instance sodium methoxide, or alkali-metal hydroxides, for instance potassium hydroxide. The reaction of the iodide with 4-methyl-5-ethyl-pyridone-(2) in the presence of potassium hydroxide and using aqueous tertiary butanol as a reaction medium gives particularly good yields of the required product, namely 1-(3',4'-dimethoxy-phenylethyl)-2-keto-4-methyl-5-ethyl-1,2-dihydro-pyridine (III). This product can suitably be isolated as the hydrochloride.

The same product is also obtained when 2-bromo-4-methyl-5-ethyl-pyridine is used instead of 4-methyl-5-ethyl-pyridone-(2) and the resulting salt is treated with alkali under mild conditions. A suitable alkali is an aqueous alcoholic solution of an alkali-metal hydroxide.

The second step, namely the treatment of the 1-(3',4'-dimethoxy-phenylethyl)-2-keto-4-methyl-5-ethyl-1,2-dihydro-pyridine with an alkyl oxalate in the presence of an alkali agent to form the pyruvic acid derivative, may suitably be conducted by first treating the said compound with the alkali agent, for instance an alkali-metal alkoxide or an alkali-metal hydride, in a solvent and then treating the resulting mixture with the alkyl oxalate. Anhydrous conditions must be used. Thus: the said compound may conveniently be treated with sodium or potassium ethoxide in a mixture of diethyl ether and ethanol and the resultant mixture treated with a solution of ethyl oxalate in diethyl ether, whereupon the sodio or potassio derivative of [1-(3',4'-dimethoxy-phenyl - ethyl) - 2 - keto - 5 - ethyl - 1,2 - dihydro - pyridine - (4)] - pyruvic acid ethyl ester is obtained (IV).

The third step, namely the conversion of the alkali-metal derivative of the pyruvic acid into the corresponding acetic acid derivative, may be carried out by treating the said alkali-metal derivative with alkali and hydrogen peroxide. Suitable alkalis are dilute aqueous solutions of sodium or potassium hydroxide. The alkali treatment as well as the hydrogen peroxide treatment are best carried out in the cold, for instance at 0° C. In another embodiment the alkali-metal derivative is saponified with acid before the treatment with alkali and hydrogen peroxide. Suitable acid medium is a mixture of dilute sulphuric acid, ice and chloroform. The free keto ester obtained is then treated as above. In a further embodiment the said alkali-metal derivative or the free ester may be converted successively into the corresponding oximino ester and oximino acid and the latter decarboxylated and dehydrated to give an acetonitrile derivative which is then converted into the corresponding carboxylic acid by acid or alkali treatment; hydroxylamine hydrochloride is suitably used for the formation of the oximino ester. The conversion of the latter into the corresponding oximino acid simply involves treatment with an alkali. The decarboxylation and dehydration of the oximino acid is brought about by heat or the action of a dehydrating agent, for instance acetic anhydride.

In a further step the pyridone acetic acid (V) is reduced to the corresponding piperidone acetic acid (VI). To this end the pyridone acetic acid may be hydrogenated at atmospheric pressure and at 20° C. in methanolic solution in the presence of an Adams catalyst until the pyridone ring is completely reduced.

The amide compound of Formula VII may be formed according to methods known per se for the preparation of amides. In an advantageous embodiment the acetic acid derivative of Formula VI is treated in dry dimethylformamide with triethyl amine and the resulting solution is reacted with a chloro-formic ester to produce a mixed anhydride which is then reacted with 2-(3',4'-dimethoxyphenyl)-ethyl amine.

The next step comprises a partial cyclisation to form the isoquinoline derivative of Formula VIII. An advantageous embodiment comprises treating the componnd of Formula VII with a polyphosphoric acid or preferably with phosphorus pentoxide under anhydrous conditions in the presence of an inert solvent such as toluene. The resulting isoquinoline compound may be used for the next step in its free base or salt form. In the latter case a convenient salt is the hydro-iodide and may be formed by treating an aqueous solution of the cyclisation product with potassium iodide.

The reduction of the dihydro-isoquinoline derivative (VIII) to the corresponding tetrahydro-isoquinoline derivative (IX) is carried out by catalytic hydrogenation, preferably using an Adams catalyst, or by using lithium aluminium hydride, lithium boron hydride or, preferably, sodium boron hydride. Methanol is considered to be a suitable solvent.

The next step comprises a second cyclisation forming a dehydro-emetinium salt (X). The cyclisation may be carried out by treating the compound of Formula IX or a salt thereof in an inert solvent such as chloroform, methanol or toluene, with phosphorus oxychloride. Particularly good yields are obtained when using as starting material to this step the hydro-iodide of the isoquinoline compound (IX) and treating it with phosphorus oxychloride in a mixture of methanol and chloroform. The product obtained may be converted into a salt, for instance the iodide hydro-iodide or the chloride hydrochloride which is suitable for the next step. The compound obtained is a dehydro-emetinium salt of Formula X.

The reduction of the dehydro-emetinium salt (X) or a hydrohalide thereof to give the compound of Formula XI or a salt thereof may be carried out by catalytic hydrogenation in an aqueous solution, preferably using an Adams catalyst, or by using lithium aluminium hydride, lithium boron hydride or, preferably, sodium boron hydride. The latter reduction can be carried out in a methanolic solution.

From the accompanying flow-sheet it will be appreciated that in some of the reactions there are formed new asymmetric centres. The compounds of Formula XI contain four asymmetric carbon atoms and, having no planes of symmetry, will therefore give rise to eight racemates and sixteen optical active isomers. In order to obtain determinate end products it is therefore necessary to separate mixtures of racemates at various steps of the process.

Accordingly a preferred embodiment for the manufacture of dl-emetine comprises catalytically hydrogenating the pyridone acetic acid (V) obtained, until the pyridone ring is completely reduced, concentrating the resulting solution and reacting in the form of its trimethyl amine salt the piperidone acetic acid racemate which has the higher melting point and which crystallises out first from said solution in dimethyl-formamide with ethyl-chloroformate, reacting the resulting mixed anhydride with 2-(3',4'-dimethoxy-phenyl)-ethyl amine, treating the resulting racemic compound of Formula VII with phosphorus pentoxide under anhydrous conditions in the presence of an inert solvent, treating the so formed substituted compound in acid solution with aqueous potassium iodide, catalytically reducing the racemic hydroiodide so formed, separating the mixture of reduced racemates so obtained by fractional crystallisation, reacting the reduced monoamide racemate which is least soluble in methanol and which possesses the lower melting point with phosphorus oxychloride in an inert solvent, converting the resulting dehydro-emetinium salt into its iodide hydroiodide by treatment in acid solution with aqueous potassium iodide, converting the said iodide hydroiodide into the chloride hydrochloride and catalytically reducing the latter in methanol, separating the resulting mixture of isomers by crystallisation in a mixture of methanol and ether, isolating dl-emetine (which is the second to crystallise out) and, if desired, resolving same with the aid of an optically active acid.

The dl-emetine obtained according to this process has an identical infra-red absorption spectrum with and has half the activity of natural emetine, with regard to its amoebicide activity which was tested in rats infected with entamoeba histolytica. dl-Emetine also possesses valuable properties as an expectorant. The product obtained according to the inventive process may therefore be used for medicinal purposes.

*Example*

(I) Thionyl chloride (8.92 g.; 5.31 ml.; 0.075 M) in dry benzene (15 ml.) was added dropwise with stirring to a solution of 2-(3',4'-dimethoxy-phenyl)-ethyl alcohol (9.1 g.; 0.05 M) and diethyl aniline (7.93 ml.; 0.05 M) in benzene (60 ml.) over a period of half an hour. During the reaction, solid separated and the mixture was kept at room temperature for one and a half hours and then heated on a boiling water bath for ten minutes. Two-thirds of the benzene was removed under reduced pressure and the resulting benzene solution was washed with water, dilute aqueous sodium carbonate and water. After drying the benzene extract (with sodium sulphate) the solvent was removed and the residue distilled to give the required chloro compound (9.45 g.; 94%) B. P. 126°/0.3 mm. This material solidified and had a melting point of 36°–40° C. and separated from ether-petroleum ether (B. P. 40°–60° C.) at −15° C. as large cubic laths of melting point 37.5°–39.5° C. Sodium iodide (131.7 g.; dry and powdered) was heated under reflux in dry methyl ethyl ketone (1000 ml.) for one and a half hours. The mixture was then cooled and 2-(3',4'-dimethoxy-phenyl)-ethyl chloride (117.08 g.) in dry methyl ethyl ketone (200 ml.) was added and the mixture again heated under reflux for a further ten hours. The sodium chloride which had precipitated was removed by filtration and, after removing most of the methyl ethyl ketone under reduced pressure, the residue was dissolved in ether and water. The aqueous layer was extracted six times with ether and finally washed with sodium thiosulphate solution and water. After drying the ether extract, the ether was removed and the residue distilled to give the required iodo compound (157.15 g.; 92%) B. P. 112° C./0.3 mm., which solidified on standing, M. P.=40°–44° C. Crystallisation from ether/petroleum ether (B. P. 40°–60° C.) gave colourless prisms of the pure compound which melted at 45°–47° C.

(II) (a) 2,6-dichloro-4-methyl-5-ethyl-pyridine (19 g.) in dry xylene (100 ml.) was added to sodium isopropoxide [prepared from sodium (2.3 g.) and isopropanol (75 ml.)] suspended in xylene (100 ml.) and heated under reflux for 16 hours. The solution was filtered and the product distilled to give essentially 2-isopropoxy-6-chloro-4-methyl-5-ethyl-pyridine (17.77 g.) B. P. 78°–80° C./0.8 mm. and $n_D$ 1.5075, contaminated with its other isomer.

It (15.4 g.) was dissolved in methanol (150 ml.) and hydrogenated in the presence of palladised charcoal (4 g.) and sodium acetate (12 g.) at ca. 20° C. and at atmospheric pressure. After the removal of catalyst and solvent the 2-isopropoxy-4-methyl-5-ethyl-pyridine (14.73 g.) B. P. 132°–134° C./7.2 mm. was distilled. A portion (2.4 g.) was heated with concentrated hydrochloric acid (15 ml.) in a sealed tube at 118° C. for four and a half hours. The 4-methyl-5-pyridone-(2) was extracted with chloroform and crystallised from ethyl acetate as prisms (47% yield) M. P. 159.5°–162° C. From the mother liquor a small amount (9%) of the other isomeric pyridone was also obtained. This reaction can also be carried out by using boiling 48% aqueous hydrobromic acid under reflux.

(b) To a solution of sodium (2.54 g.) in dry benzyl alcohol (90 ml.) was added 2,6-dichloro-4-methyl-5-ethyl-pyridine (18.9 g.) [Ruzicka and Fornasir, Helv. Chim. Acta, 1919, 2, 338]. The solution was heated on a boiling water bath for 9 hours. The reaction was then completed by heating the solution under reflux for 45 minutes until the reaction mixture was neutral. The benzyl alcohol was removed under reduced pressure and the residue was treated with water and extracted with ether which was washed with water and dried ($K_2CO_3$). Two distillations gave essentially 2-benzyloxy-6-chloro-4-methyl-5-ethyl-pyridine (23.07 g.) B. P. 150° C./0.6 mm. as a colourless liquid contaminated with a small amount of the other isomer.

This last mentioned pyridine base (2.5 g.) was reduced in methanol at room temperature (ca. 20° C.) and atmospheric pressure in the presence of palladised charcoal. After the uptake of the theoretical amount of hydrogen the solution was filtered and concentrated. On addition of ethyl acetate the hydrochloride of 4-methyl-5-ethyl-pyridone-(2) (0.9 g.) M. P. 161°–168° C. separated. The salt was dissolved in water, made alkaline with dilute ammonia and extracted with chloroform. This yielded, after crystallisation from ethyl acetate, the pure pyridone as small prisms; M. P. 160°–162° C.

(III) Potassium hydroxide (1.32 g.) was dissolved in water (1 ml.) with warming and tertiary butanol (80 ml.) was then added. 5-ethyl-4-methyl-pyridone-(2) (2.72 g.) was added followed by 2-(3',4'-dimethoxy-phenyl)-ethyl iodide (5.84 g.) and the solution heated under reflux for four hours. The t-butanol was removed under reduced pressure and water was added to the residue. The product was extracted with benzene (3 times) and washed with water. Removal of the benzene gave a yellow gum which with ethereal hydrogen chloride gave the hydrochloride of 1-(3',4'-dimethoxy-phenylethyl)-2-keto-4-methyl-5-ethyl-1,2-dihydro-pyridine (4.28 g.) M. P. 199°–201.5° C. It separated from ethyl-acetate/ether as colourless transparent prisms, M. P. 72°–75.5° C.

(IV) 2.85 ml. of absolute ethanol were added dropwise to 0.43 g. of freshly cut potassium under 10 ml. of dry ether followed by 1.6 g. of ethyl oxalate in 6 ml. ether at 0° C. 3.01 g. of 1-(3',4'-dimethoxy-phenylethyl)-2-keto-4-methyl-5-ethyl-1,2-dihydro-pyridine in 40 ml. dry benzene and 140 ml. ether were then added and the solution heated under reflux for 24 hours. After cooling at 0° C. for 4 hours, 3.01 g. of the yellow potassio derivative was filtered and washed with ether. Treatment of the potassio derivative with dilute sulphuric acid, followed by extraction with chloroform, gave [1-(3',4'-dimethoxy-phenylethyl)-2-keto-5-ethyl-1,2-dihydro-pyridyl-(4)]-pyruvic acid which crystallised from ethanol/ethyl-acetate as yellow prisms; M. P. 141.5°–142.5° C.

(V) 3 g. of the yellow potassio derivative of the pyruvate ester were dissolved in 12.4 ml. of aqueous sodium hydroxide (10%) at 0° C. and kept at this temperature for 18 hours. A small amount of ice was added followed by 2.41 ml. hydrogen peroxide (30%). The reaction mixture was kept at 0° C. for 24 hours, when a further quantity of 1.03 ml. of hydrogen peroxide (30%) was added and kept at 0° C. for a further 24 hours. After the addition of a small quantity of manganese dioxide the solution was filtered and the filtrate made slightly acid with hydrochloric acid and then extracted with chloroform. Removal of the chloroform and treatment of the residue with ethereal hydrogen chloride and treatment of the residue with ethereal hydrogen chloride gave 1.92 g. of the hydrochloride of the required acetic acid derivative which crystallised from methanol/ether as well formed prisms; M. P. 160.5°–162.5° C. (with decomposition). The free acetic acid derivative was obtained by dissolving the hydrochloride in water and extracting it with chloroform. Crystallisation from methanol gave the pure acid; M. P. 154° C. (with decomposition).

(VI) 6.91 g. of [1-(3',4'-dimethoxy-phenylethyl)-2-keto-5-ethyl-pyridyl-(4)]-acetic acid was hydrogenated in 400 ml. of methanol in the presence of 0.3 g. of Adams catalyst (platinum dioxide) at ca. 20° C. and at atmospheric pressure. After 2 to 3 days, the slow uptake of hydrogen (ca. 2 mols) ceased and the solution was filtered and concentrated. The product, [1-(3',4'-dimethoxy-phenylethyl)-2-keto-5-ethyl-piperidyl-(4)]-acetic acid, crystallised out in two stages. In the first stage there was obtained 4.56 g. (70% yield) racemic piperidone acetic acid which crystallised out as colourless prisms of melting point 154°–156° C. On continuing the concentration of the mother liquor, 0.94 g. (14%) of a second racemic crystallised out as colourless prisms of melting point 152°–153° C.

(VII) 2.79 g. of the racemate melting at 154°–156° C. was dissolved in 25 ml. of dry dimethyl-formamide and treated with 0.85 g. of triethyl amine at 0° C. The solution was then cooled to —30° C. and a solution of 1.12 g. of ethyl chloroformate in 4 ml. of dry dioxane was added dropwise thereto over a period of 10 minutes. The mixture was maintained at —30° C. for a further 5 minutes and was then allowed to warm up to —10° C. for 10 minutes. 1.69 g. of 3,4-dimethoxy-phenylethyl amine and 0.85 g. of triethyl amine in 20 ml. of dimethyl-formamide was then added with stirring and over a period of 10 minutes. The mixture was then kept at ca. 20° C. for 16 hours. The solution was concentrated under reduced pressure to a thick syrup, dissolved in chloroform and washed with dilute hydrochloric acid, dilute sodium carbonate and water. After drying with sodium sulphate, the chloroform solution yielded a pale yellow residue which was the 3,4-dimethoxy-phenylethyl-amide of [1-(3',4'-dimethoxy-phenylethyl)-2-keto-5-ethyl-piperidyl-(4)]-acetic acid. The yield was nearly quantitative.

(VIII) 5.28 g. of 3,4-dimethoxy-phenylethyl-amide of [1 - (3',4' - dimethoxy - phenylethyl) - 2 - keto - 5-ethyl-piperidyl-(4)]-acetic acid were dissolved in 140 ml. of dry toluene and treated with 50 g. of phosphorus pentoxide under reflux for 45 minutes. A further 50 g. of phosphorus pentoxide was then added and the heating under reflux continued for a further one and a quarter hours. The toluene was decanted and the residual material added cautiously to chopped ice. The aqueous solution thus obtained was then extracted once with ether and then treated with an aqueous potassium iodide solution. The hydroiodide formed was extracted three times with chloroform, dried, evaporated and crystallised from methanol/ethyl acetate to give 8.05 g. of 1-[[1'-(3'',4''-dimethoxy - phenylethyl) - 5' - ethyl - 2' - keto - piperidyl - (4')] - methyl] - 6,7 - dimethoxy - 3,4 - dihydro - isoquinoline in yellow prisms; M. P. 190°–192° C.

(IX) 9.33 g. of the hydroiodide of 1-[[1'-(3'',4''-dimethoxy - phenylethyl) - 5' - ethyl - 2' - keto - piperidyl - (4')]-methyl] - 6,7 - dimethoxy - 3,4 - dihydro-isoquinoline was dissolved in 150 ml. of methanol and hydrogenated in the presence of Adams catalyst at ca. 20° C. and atmospheric pressure until one molecule of hydrogen had been absorbed. The solution was filtered and concentrated; on cooling the hydroiodide of 1 - [[1' - (3'',4'' - dimethoxy - phenylethyl) - 5' - ethyl-2' - keto - piperidyl - (4')] - methyl] - 6,7 - dimethoxy-1,2,3,4-tetrahydro-isoquinoline separated as colourless prisms; 3 g., M. P. 214°–216° C. On concentration of the mother liquor the second stereoisomer, tetrahydroisoquinoline derivative, was obtained as the hydroiodide which, after recrystallisation, separated from methanol/ether as pale yellow plates; 2.1 g., M. P. 207°–208.5° C.

(X) 2.4 g. of the hydroiodide of 1-[[1'-(3",4"-dimethoxy - phenylethyl) - 2' - keto - 5' - ethyl - piperidyl-(4')] - methyl] - 6,7 - dimethoxy - 1,2,3,4 - tetrahydroisoquinoline was dissolved in 15 ml. of warm chloroform and then treated with 15 ml. of dry toluene and 14 ml. of phosphorus oxychloride and heated under reflux on a boiling water bath for 30 minutes. The solution was then concentrated to a red gum under reduced pressure and dissolved in warm water and filtered. The aqueous filtrate was treated with an aqueous potassium iodide solution and the precipitated oily dehydro-emetinium iodide hydroiodide was extracted with chloroform and eventually crystallised from methanol/ethyl acetate from which it separated as small yellow prisms; 2.25 g., 79%, M. P. 195°–196° C.

(XI) 1.89 g. of the dehydro-emetinium iodide hydroiodide was dissolved in 50 ml. of water and shaken with 2 g. of silver chloride (from silver nitrate) for 15 minutes, filtered and concentrated to dryness. The colourless syrup was dissolved in 50 ml. of methanol and hydrogenated in the presence of Adams catalyst at ca. 20° C. and atmospheric pressure. After the uptake of hydrogen had stopped the solution was filtered, concentrated and diluted with ether and 2 drops of dilute hydrochloric acid. A stereoisomer of emetine crystallised readily as colourless prisms; 0.6 g., M. P. 250°–270° C. (softens at 240° C.). From the mother liquor the second stereoisomer dl-emetine dihydrochloride was isolated. After recrystallisation from methanol/ether, it separated as colourless prisms; 0.4 g., M. P. 249°–256° C. (softens at 245° C.).

(XII) The dl-emetine dihydrochloride was converted into the free base and treated with dibenzoyl (+)-tartaric acid. Resolution by fractional crystallisation of the resulting tartrate yielded a bis-(dibenzoyl tartrate) salt of melting point 180°–181° C. and rotation $[\alpha]_D^{20} = -62.85$. This salt is identical with that obtainable from natural emetine.

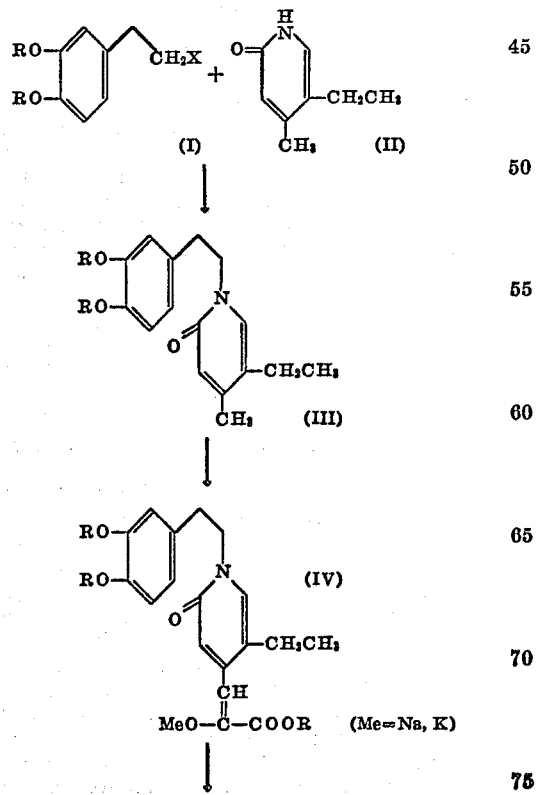

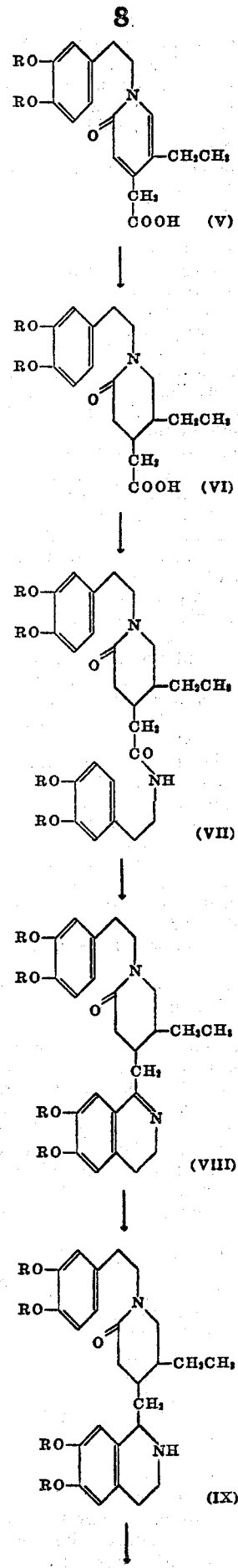

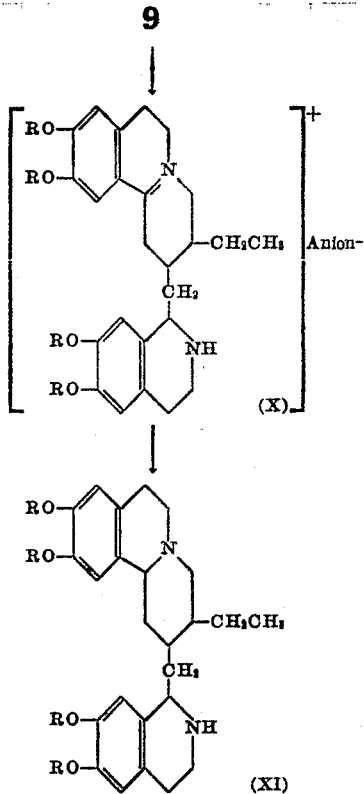

We claim:

1. 1 - [[1' - (3",4" - dimethoxy - phenylethyl) - 2'-keto - 5' - ethyl - piperidyl - (4')] - methyl] - 6,7 - dimethoxy-3,4-dihydro-isoquinoline.

2. 1 - [[1' - (3",4" - dimethoxy - phenylethyl) - 2'-keto - 5' - ethyl - piperidyl - (4')] - methyl] - 6,7 - dimethoxy-1,2,3,4-tetrahydro-isoquinoline.

3. A process for the manufacture of dl-emetine, which comprises cyclising 3,4-dimethoxy-phenylethyl-amide of [1 - (3',4' - dimethoxy-phenylethyl) - 2 - keto - 5 - ethyl-piperidyl-(4)]-acetic acid by treating the same in an inert solvent under anhydrous conditions with an agent selected from the group consisting of phosphorus pentoxide and a polyphosphoric acid and reducing the 1-[[1'- (3",4" - dimethoxy - phenylethyl) - 2' - keto - 5' - ethyl-piperidyl - (4')] - methyl] - 6,7 - dimethoxy - 3,4 - dihydro-isoquinoline to the corresponding 1,2,3,4-tetrahydro-isoquinoline compound, cyclising the reduction product by treating the same in an inert solvent with phosphorus oxychloride and reducing the salt of 2-[[6',7'-dimethoxy - 1',2',3',4' - tetrahydro - isoquinolyl - (1 - )]-methyl] - 3 - ethyl - 9,10 - dimethoxy - 1,2,3,4,6,7 - hexahydro-benzo[a]quinolizinium to the corresponding 1,2,3,-4,6,7-hexahydro-11b-benzo[a]quinolizine.

4. A process according to claim 3, which comprises separating the mixture of racemic isomers obtained by the first mentioned reducing step and further treating only one of said isomers.

5. A process according to claim 3 which comprises treating 3,4-dimethoxy-phenylethylamide of [1-(3',4'-dimethoxy - phenylethyl) - 2 - keto - 5 - ethyl - piperidyl-(4)]-acetic acid with phosphorus pentoxide in an anhydrous solvent, treating the isoquinolyl derivative in acid solution with aqueous potassium iodide, catalytically reducing the hydroiodide formed, separating the reduced racemates by fractional crystallisation, reacting the racemate which possesses the lower melting point with phosphorus oxychloride in an inert solvent, converting the resulting dehydro-emetinium salt into its chloride hydrochloride, catalytically reducing the latter, separating the resulting mixture by fractional crystallisation and isolating the second compound to crystallise out.

References Cited in the file of this patent
UNITED STATES PATENTS

| | | |
|---|---|---|
| 2,524,957 | Burrows et al. | Oct. 10, 1950 |
| 2,703,323 | Karrer et al. | Mar. 1, 1955 |
| 2,704,760 | Jones | Mar. 22, 1955 |
| 2,735,851 | Cislak | Feb. 21, 1956 |
| 2,775,595 | Goldberg | Dec. 25, 1956 |
| 2,781,345 | Leavitt | Feb. 12, 1957 |

OTHER REFERENCES

Chem. Abstracts, vol. 45, 1951, pages 7577, 7578, citing Evstigneeva et al., Doklady Akad. Nauk, vol. 75, #4, pp. 539–542, 1950.

Chem. Abstracts, vol. 47, 1953, pp. 5949–5950, citing Evstigneeva et al., Zhur. Obschchei Khim, vol. 22, pp. 1467–77 (1952).

UNITED STATES PATENT OFFICE

CERTIFICATE OF CORRECTION

Patent No. 2,877,227 March 10, 1959

Aaron Cohen et al.

It is hereby certified that error appears in the printed specification of the above numbered patent requiring correction and that the said Letters Patent should read as corrected below.

Column 1, line 38, for "group of desired" read — group if desired —; line 40, for "piperiodoneacetic" read — piperidoneacetic —; column 3, line 54, for "optical" read — optically —; column 4, line 75, for "5-pyridone" read — 5-ethyl-pyridone —; column 5, line 75, strike out "chloride and treatment of the residue with ethereal hydro-"; column 6, line 1, strike out "gen"; line 22, for "racemic" read — racemate —; line 58, for "-(3′,4″-" read -(3″, 4″- —.

Signed and sealed this 21st day of July 1959.

(SEAL)
Attest:

KARL H. AXLINE
Attesting Officer

ROBERT C. WATSON
Commissioner of Patents